US011151322B2

(12) United States Patent
Frison

(10) Patent No.: US 11,151,322 B2
(45) Date of Patent: Oct. 19, 2021

(54) COMPUTER-IMPLEMENTED METHOD, SYSTEM AND COMPUTER PROGRAM PRODUCT FOR PROVIDING AN APPLICATION INTERFACE

(71) Applicant: SAP SE, Walldorf (DE)

(72) Inventor: Giancarlo Frison, Munich (DE)

(73) Assignee: SAP SE, Walldorf (DE)

( * ) Notice: Subject to any disclaimer, the term of this patent is extended or adjusted under 35 U.S.C. 154(b) by 379 days.

(21) Appl. No.: 16/177,983

(22) Filed: Nov. 1, 2018

(65) Prior Publication Data

US 2019/0278845 A1 Sep. 12, 2019

(30) Foreign Application Priority Data

Mar. 6, 2018 (EP) ..................................... 18000220

(51) Int. Cl.
*G06F 40/00* (2020.01)
*G06F 40/30* (2020.01)
(Continued)

(52) U.S. Cl.
CPC ........... *G06F 40/30* (2020.01); *G06N 3/0445* (2013.01); *G06N 3/0454* (2013.01); *G06N 3/08* (2013.01); *G06N 3/006* (2013.01)

(58) Field of Classification Search
CPC ......... G10L 15/16; G10L 15/00; G10L 15/04; G10L 15/05; G10L 15/06; G10L 15/063;
(Continued)

(56) References Cited

U.S. PATENT DOCUMENTS

2016/0322055 A1* 11/2016 Sainath .................. H04R 3/005
2017/0076196 A1* 3/2017 Sainath .................. G06N 3/084
(Continued)

FOREIGN PATENT DOCUMENTS

WO 2017/006104 A1 1/2017
WO 2017/200597 A1 11/2017

OTHER PUBLICATIONS

"Communication: Extended European Search Report", dated Sep. 19, 2018 (Sep. 19, 2018), European Patent Office, for European Application No. 18000220.6-1221, 9pgs.

*Primary Examiner* — Edgar X Guerra-Erazo
(74) *Attorney, Agent, or Firm* — Buckley, Maschoff & Talwalkar LLC

(57) ABSTRACT

A computer-implemented method is provided for providing an interface between a frontend application configured to receive one or more user inputs in a natural language and a backend system configured to provide a service to a user. The method may comprise: receiving a text input in the natural language via the frontend application; performing computation using the received text input and a neural network, the neural network comprising: a convolutional layer configured to generate feature values by applying one or more filters to an input matrix obtained from the received text input, each of the one or more filters having a window size corresponding to one or more words contained in the text input; one or more long short-term memory, LSTM, layers configured to generate output values by processing at least a part of the feature values generated by the convolutional layer; and an output layer configured to generate an output vector based on the output values generated by the one or more LSTM layers, the output vector representing an action to be performed by the backend system in response to the received text input; identifying the action represented by the output vector generated as a result of the computation;

(Continued)

communicating the identified action to the backend system for the backend system to perform the identified action; and providing the frontend application with a text output in the natural language based on the identified action.

11 Claims, 12 Drawing Sheets

(51) Int. Cl.
*G06N 3/04* (2006.01)
*G06N 3/08* (2006.01)
*G06N 3/00* (2006.01)

(58) Field of Classification Search
CPC ..... G10L 2015/0631; G10L 2015/0633; G10L 2015/086; G10L 2015/088; G10L 15/18; G10L 15/1822; G10L 15/20; G10L 15/26; G10L 15/30; G10L 15/32; G10L 17/18; G10L 17/20; G10L 17/22; G06F 40/00; G06F 40/10; G06F 40/20; G06F 40/205; G06F 40/211; G06F 40/216; G06F 40/253; G06F 40/263; G06F 40/268; G06F 40/274; G06F 40/289; G06F 40/295; G06F 40/35; G06F 40/30; G06N 3/02; G06N 3/04; G06N 3/0454; G06N 3/049; G06N 3/0481; G06N 3/082; G06N 3/08; G06N 3/084; G06N 3/088; G06N 3/086; G06N 3/12; G06N 3/126; G06N 5/00; G06N 20/00; G06N 20/10; G06N 20/20
USPC ............................................................ 704/9
See application file for complete search history.

(56) References Cited

U.S. PATENT DOCUMENTS

| | | | |
|---|---|---|---|
| 2017/0262705 A1* | 9/2017 | Li | G06K 9/6269 |
| 2017/0337464 A1* | 11/2017 | Rabinowitz | G06F 17/16 |
| 2018/0204120 A1* | 7/2018 | Rei | G06N 3/0445 |
| 2019/0080176 A1* | 3/2019 | Lan | G06N 3/0454 |
| 2019/0199845 A1* | 6/2019 | Choi | H04M 1/03 |
| 2019/0205747 A1* | 7/2019 | Srivastava | G06N 3/0445 |
| 2020/0005766 A1* | 1/2020 | Kim | G10L 15/16 |
| 2020/0010999 A1* | 1/2020 | Lee | D06F 33/48 |
| 2020/0133211 A1* | 4/2020 | Lee | G05B 13/0265 |
| 2020/0286275 A1* | 9/2020 | Seo | G06T 11/60 |

* cited by examiner

COMPUTER-IMPLEMENTED METHOD, SYSTEM AND COMPUTER PROGRAM PRODUCT FOR PROVIDING AN APPLICATION INTERFACE

CROSS-REFERENCE TO RELATED APPLICATIONS

The present application claims priority under 35 U.S.C. § 119(a) to EP Patent Application No. 18 000 220.6, filed Mar. 6, 2018, the contents of which are incorporated herein by reference for all purposes

BACKGROUND

The present application relates to a computer-implemented method, system and computer program product for providing a conversational application interface.

A chatbot (also known as a talkbot, chatterbot, Bot, IM bot, interactive agent, or Artificial Conversational Entity) is a computer program which conducts a conversation via auditory or textual methods. Chatbots are typically used in dialog systems for various practical purposes including customer service or information acquisition. Some chatbot systems may employ natural language processing (NLP) and others may scan for keywords within the input, then pull a reply with the most matching keywords, or the most similar wording pattern, from a database.

A chatbot may be incorporated in a conversational application that is a computer program that combines NLP with underlying services in order to execute the underlying services by means of text. Such a conversational application may make use of a machine learning (ML) based system for detecting the intention of a user. A limited set of intentions of a user may be converted into commands for composing workflows for providing the underlying services. Some procedures of the workflows are not always attainable by a simple, single user input (e.g., a single sentence input by the user, a single action performed by the user etc.) but may require a sequence of user actions for achieving goals. For example, in case of a checkout process of an online shopping service, more than one user inputs (e.g., delivery address, invoice address, delivery options, telephone number, etc.) may be required for completing the workflow of the process.

Conversational workflows may be managed by state-machine engines implemented in the chatbot system. Alternatively, conversational workflows may be managed by existing applications such as Dialogflow (former API.AI), Wit.ai, LUIS.ai (Language Understanding Intelligent Service) on which chatbot designers can setup conversation processes by using web dashboards.

Conversational workflows managed by state-machine engines based on a limited set of user intentions may have rigid characteristics concerning activations and behaviors. In other words, such conversational workflows may need to be hard-coded based on a fixed set of user intentions. Further, variations of such conversational workflows may require a review of the workflows themselves, may result in growing complexity of the workflows and may become unmanageable over time. Moreover, it may be almost impossible to manage a large amount of variables that can affect such conversational workflows since exponential branches of the workflow tree may need to be produced.

BRIEF DESCRIPTION

According to an aspect, a computer-implemented method is provided for providing an interface between a frontend application configured to receive one or more user inputs in a natural language and a backend system configured to provide a service to a user. The method may comprise:

receiving a text input in the natural language via the frontend application;

performing computation using the received text input and a neural network, the neural network comprising:

a convolutional layer configured to generate feature values by applying one or more filters to an input matrix obtained from the received text input, each of the one or more filters having a window size corresponding to one or more words contained in the text input;

one or more long short-term memory, LSTM, layers configured to generate output values by processing at least a part of the feature values generated by the convolutional layer; and an output layer configured to generate an output vector based on the output values generated by the one or more LSTM layers, the output vector representing an action to be performed by the backend system in response to the received text input;

identifying the action represented by the output vector generated as a result of the computation;

communicating the identified action to the backend system for the backend system to perform the identified action; and providing the frontend application with a text output in the natural language based on the identified action.

In various embodiments and examples described herein, examples of the frontend application may include, but are not limited to, an Instant Messaging application (e.g. Facebook messenger, Skype, Viber, iMessage, WhatsApp, LINE, etc.) and an SMS (short message service) application.

In various embodiments and examples described herein, examples of a service provided by the backend system may include, but are not limited to, trouble shooting of a device and/or system, online shopping and online reservation (of e.g., concerts, movies, theaters, restaurants, hotels, flights, trains, rent-a-car, etc.).

In various embodiments and examples described herein, the term "neural network" may be understood as an "artificial neural network".

In various embodiments and examples described herein, a long short-term memory (LSTM) layer may refer to a layer of a recurrent neural network (RNN) including an LSTM block or unit. An exemplary LSTM block may be composed of a cell, an input gate, an output gate and a forget gate. The cell may "remember" values over arbitrary time intervals, e.g. implementing an internal "memory". Each of the input, output and forget gates may be considered as a neuron (e.g. node) in a neural network, which computes an activation of a weighted sum using an activation function. The input, output and forget gates may be connected to the cell and may be considered as regulators of the flow of values that goes through the connections of the LSTM. The LSTM layer may use the internal memory implemented by the cell to process arbitrary sequences of inputs.

In the method according to the above-stated aspect, the convolutional layer comprised in the neural network may be configured to apply a plurality of filters to the input matrix for generating the feature values, the plurality of filters having different window sizes.

In some examples where the plurality of filters have different window sizes, each of the plurality of filters may have a window size of 1, 2, 3, . . . , or N, where N is the number of the plurality of filters. In some other examples where the plurality of filters have different sizes, each of the plurality of filters may have a window size of 2, 3, . . . , or N+1. In these exemplary cases, the convolutional layer may generate feature values corresponding to (1-gram,) 2-gram, 3-gram, N-gram (and N+1-gram) models of the text input.

In the method according to the above-stated aspect, the one or more LSTM layers comprised in the neural network may be configured to process all the feature values generated by the convolutional layer for generating the output values. For instance, in case a plurality of filters are applied to the input matrix at the convolutional layer, the feature values generated by applying the plurality of filters may simply be concatenated and the concatenated feature values may be used as an input (e.g. an input vector) for the one or more LSTM layers.

In some examples of the method according to the above-stated aspect, the neural network may further comprise a max-pooling layer configured to perform a max-pooling operation to the feature values generated by the convolutional layer; and the one or more LSTM layers comprised in the neural network may be configured to process values selected from the feature values in the max-pooling operation for generating the output values.

In various embodiments and examples described herein, the max-pooling operation may be an operation to select an element which has a maximum value among a group of elements.

In the method according to the above-stated aspect, the one or more LSTM layers comprised in the neural network may be configured to process not only at least the part of the feature values generated by the convolutional layer but also additional input parameters relating to the service provided by the backend system for generating the output values.

In various embodiments and examples described herein, the "additional input parameters" may be parameters that can affect the determination on the action to be taken by the backend system.

Configuring the LSTM layer(s) to process not only at least part of the feature values generated by the convolutional layer but also the additional input parameters relating to the service by the backend system may facilitate provision of the interface between the frontend application and the backend system in consideration with variables (even with a huge number of variables) that can affect the determination on the action to be taken by the backend system.

Further, the method according to the above-stated aspect may further comprise:
  receiving a sequence of possible text inputs and information indicating an action to be taken by the backend system in response to each of the possible text inputs; and
  training the neural network using a sequence of input matrices obtained from the sequence of the possible text inputs and the information indicating the action to be taken by the backend system in response to each of the possible text inputs,
  wherein a set of additional input parameters to be processed by the one or more LSTM layers together with each of the possible text inputs may be further received and used for training the neural network.

According to another aspect, a computer-implemented method is provided for training a neural network to provide an interface between a frontend application configured to receive one or more user inputs in a natural language and a backend system configured to provide a service to a user.

The method may comprise:
  receiving a sequence of possible text inputs and information indicating an action to be taken by the backend system in response to each of the possible text inputs; and
  training the neural network using a sequence of input matrices obtained from the sequence of the possible text inputs and the information indicating the action to be taken by the backend system in response to each of the possible text inputs,
  wherein the neural network may comprise:
    a convolutional layer configured to generate feature values by applying one or more filters to an input matrix obtained from a text input, each of the one or more filters having a window size corresponding to one or more words contained in the text input;
    one or more long short-term memory, LSTM, layers configured to generate output values by processing at least a part of the feature values generated by the convolutional layer; and
    an output layer configured to generate an output vector based on the output values generated by the one or more LSTM layers, the output vector representing an action to be performed by the backend system in response to the text input.

In the method of the other aspect as stated above, the one or more LSTM layers comprised in the neural network may be configured to generate output values by processing not only at least the part of the feature values generated by the convolutional layer but also additional input parameters relating to the service provided by the backend system;
  wherein the method may further comprise:
    receiving a set of additional input parameters to be processed by the one or more LSTM layers together with each of the possible text inputs; and
  wherein the set of additional input parameters may further be used for training the neural network.

According to yet another aspect, a computer program product is provided. The computer program product may comprise computer-readable instructions that, when loaded and run on a computer, cause the computer to perform the method according to any one of the aspects and examples stated above.

According to yet another aspect, a system is provided for providing an interface between a frontend application configured to receive one or more user inputs in a natural language and a backend system configured to provide a service to a user. The system may comprise one or more processors configured to:
  receive a text input in the natural language via the frontend application;
  perform computation using the received text input and a neural network, the neural network comprising:
    a convolutional layer configured to generate feature values by applying one or more filters to an input matrix obtained from the received text input, each of the one or more filters having a window size corresponding to one or more words contained in the text input;
    one or more long short-term memory, LSTM, layers configured to generate output values by processing at least a part of the feature values generated by the convolutional layer; and
    an output layer configured to generate an output vector based on the output values generated by the one or more LSTM layers, the output vector representing an action to be performed by the backend system in response to the received text input;

identify the action corresponding to the output vector generated as a result of the computation;

communicate the identified action to the backend system for the backend system to perform the identified action; and provide the frontend application with a text output in the natural language based on the identified action.

In the system according to the above-stated aspect, the convolutional layer comprised in the neural network may be configured to apply a plurality of filters to the input matrix for generating the feature values, the plurality of filters having different window sizes; and the one or more LSTM layers comprised in the neural network may be configured to process all the feature values generated by the convolutional layer for generating the output values.

In the system according to the above-stated aspect, the one or more LSTM layers comprised in the neural network may be configured to process not only at least the part of the feature values generated by the convolutional layer but also additional input parameters relating to the service provided by the backend system for generating the output values.

In the system according to the above-stated aspect, the neural network may further comprise a max-pooling layer configured to perform a max-pooling operation to the feature values generated by the convolutional layer. In this exemplary configuration, the one or more LSTM layers comprised in the neural network may be configured to process values selected from the feature values in the max-pooling operation for generating the output values.

In the system according to the above-stated aspect, the one or more processors may further be configured to:

receive a sequence of possible text inputs and information indicating an action to be taken by the backend system in response to each of the possible text inputs; and train the neural network using a sequence of input matrices obtained from the sequence of the possible text inputs and the information indicating the action to be taken by the backend system in response to each of the possible text inputs, wherein a set of additional input parameters to be processed by the one or more LSTM layers together with each of the possible text inputs may be further received and used for training the neural network.

According to yet another aspect, a system is provided for training a neural network to provide an interface between a frontend application configured to receive one or more user inputs in a natural language and a backend system configured to provide a service to a user. The system may comprise one or more processors configured to:

receive a sequence of possible text inputs and information indicating an action to be taken by the backend system in response to each of the possible text inputs; and train the neural network using a sequence of input matrices obtained from the sequence of the possible text inputs and the information indicating the action to be taken by the backend system in response to each of the possible text inputs, wherein the neural network may comprise:

a convolutional layer configured to generate feature values by applying one or more filters to an input matrix obtained from a text input, each of the one or more filters having a window size corresponding to one or more words contained in the text input;

one or more long short-term memory, LSTM, layers configured to generate output values by processing at least a part of the feature values generated by the convolutional layer; and an output layer configured to generate an output vector based on the output values generated by the one or more LSTM layers, the output vector representing an action to be performed by the backend system in response to the text input.

In the system provided for training the neural network according to the other aspect as stated above, the one or more LSTM layers comprised in the neural network may be configured to generate output values by processing not only at least the part of the feature values generated by the convolutional layer but also additional input parameters relating to the service provided by the backend system;

wherein the one or more processors may further be configured to:

receiving a set of additional input parameters used by the one or more LSTM layers together with each of the possible text inputs; and wherein the set of additional input parameters may further be used for training the neural network.

The above-stated aspects and various examples may eliminate the need of hard-coding conversational workflows by making use of ML and NLP techniques that ingest sequences of user's utterances (e.g., input texts) for predicting command(s) to execute (e.g. an action to be taken by the backend system) in a conversational context. The above-stated aspects and various examples can not only detect the user intention by analyzing the semantic of a single phrase, but also can predict a next action to be performed, according to the history of the current conversation. Accordingly, generation of hard-coded workflows and/or designing of state-machine engines may be unnecessary, according to the above-stated aspects and various examples.

According to one or more of the above-stated aspects and various examples, in some circumstances, provision of a conversational application interface such as a chatbot may be facilitated. For example, one or more of the above-stated aspects and various examples, in some circumstances, allow chatbot owners to create more human-like interaction with users since it can facilitate managing exceptions, corner-case situations, ambiguities that represent the normality in human interactions.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION

In the following text, a detailed description of examples will be given with reference to the drawings. It should be understood that various modifications to the examples may be made. In particular, one or more elements of one example may be combined and used in other examples to form new examples.

System Configuration

Figure 1:
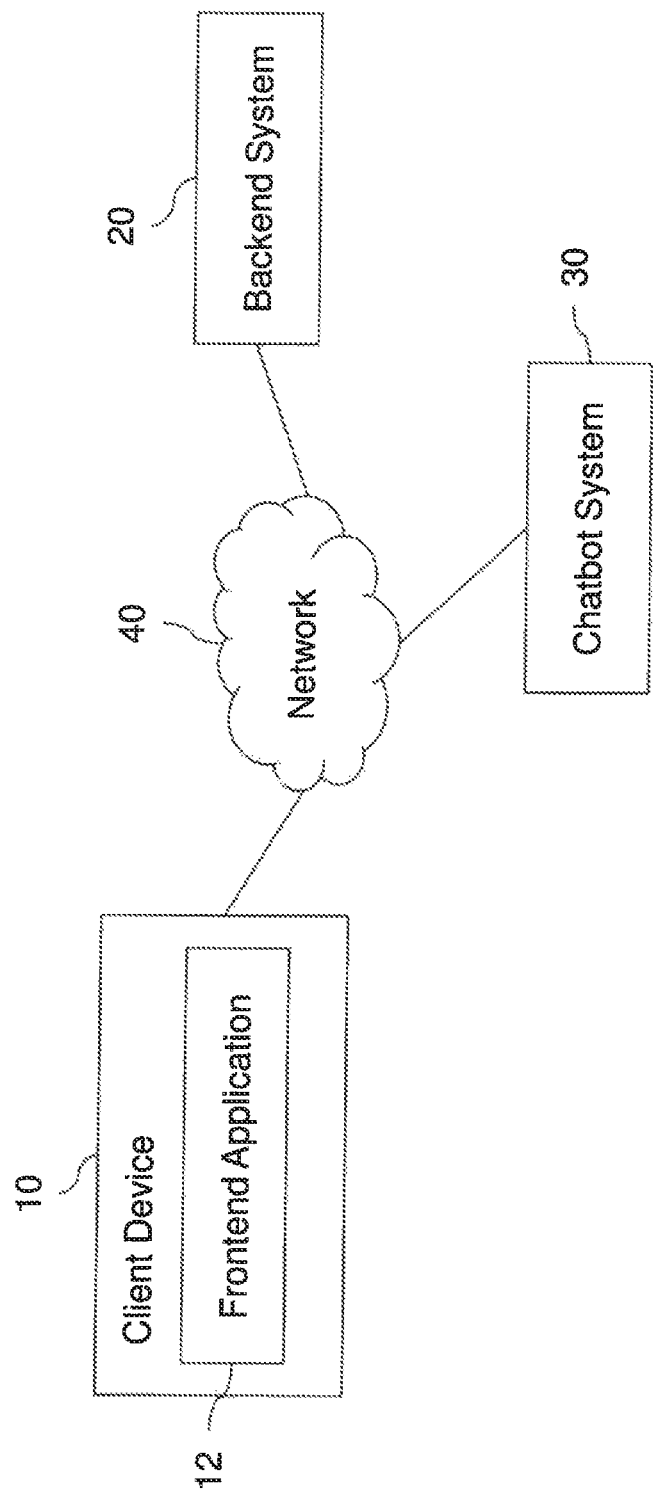
FIG. 1 shows an example of a system including the system according to the present disclosure.

FIG. 1 shows an example of a system including the system according to the present disclosure.

The exemplary system of FIG. 1 comprises a client device 10, a backend system 20 and a chatbot system 30, which are connected via a network 40. The network 40 may include the Internet and/or one or more intranets. Further, at least part of the network 40 may be implemented by a wireless network (e.g. wireless local area network (WLAN), cellular network, etc.).

The client device 20 may be a mobile device such as a mobile phone (e.g. smartphone), a tablet computer, a laptop computer, a personal digital assistant (PDA), etc. In some examples, the client device 20 may be a computer such as a personal computer. The client device 20 may access the backed system 20 via the network 40 for a user of the client device 20 to use a service provided by the backend system 20. The client device 20 may comprise a frontend application 12.

The frontend application 12 may be configured to receive one or more user inputs in a natural language. The frontend application 12 may be further configured to provide the user with one or more outputs in a natural language. The frontend application 12 may be, for example, an Instant Messaging application (e.g. Facebook messenger, Skype, Viber, iMessage, WhatsApp, LINE, etc.). Further, in the examples where the client device 20 is a mobile phone, the frontend application 12 may be an SMS application.

The examples of the frontend application 12, however, are not limited to the Instant Messaging application and the SMS application. The frontend application 12 may be yet another kind of application as long as the application is configured to receive one or more user inputs and provide one or more outputs in a natural language.

The backend system 20 may be configured to provide a service to a user. The service may be any online service that can be provided using a software application implemented on a computer system that may be connected to the network 40. The service provided by the backend system 20 may require a sequence of user inputs for completing provision of the service. Examples of the service provided by the backed system may include, but are not limited to, trouble shooting of a device and/or system, online shopping and online reservation (of e.g., concerts, movies, theaters, restaurants, hotels, flights, trains, rent-a-car, etc.). The backend system 20 may be implemented using one or more computers such as server computers.

The chatbot system 30 may be configured to provide an interface between the frontend application 12 of the client device 10 and the backend system 20. For example, the chatbot system 30 may be configured to receive a text input in the natural language via the frontend application 12 and perform computation using the received text input and a neural network to identify an action to be performed by the backend system 20 in response to the received text input. The chatbot system 30 may be further configured to communicate the identified action to the backend system 20 for the backend system 20 to perform the identified action and provide the frontend application 12 with a text output in the natural language based on the identified action. The chatbot system 30 may be implemented using one or more computers such as server computers.

In some examples, the backend system 20 and/or the chatbot system 30 may be implemented by cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud computing environment may have one or more of the following characteristics: multitenancy, performance monitoring, virtual resources that are dynamically assignable to different users according to demand, multiple redundant sites, multiple virtual machines, network accessibility (e.g., via. the Internet) from multiple locations (e.g., via a web browser) and devices (e.g., mobile device or PC). In comparison to an on-premises computing environment, the cloud computing environment may have a higher ratio of virtual resources to physical resources (e.g., a higher ratio of virtual machines to physical machines).

It should be noted that, although FIG. 1 shows a single client device 10, a single backend system 20 and a single chatbot system 30, more than one client device 10, more than one backed system 20 and/or more than one chatbot system 30 may be connected to the network 40.

Figure 2:
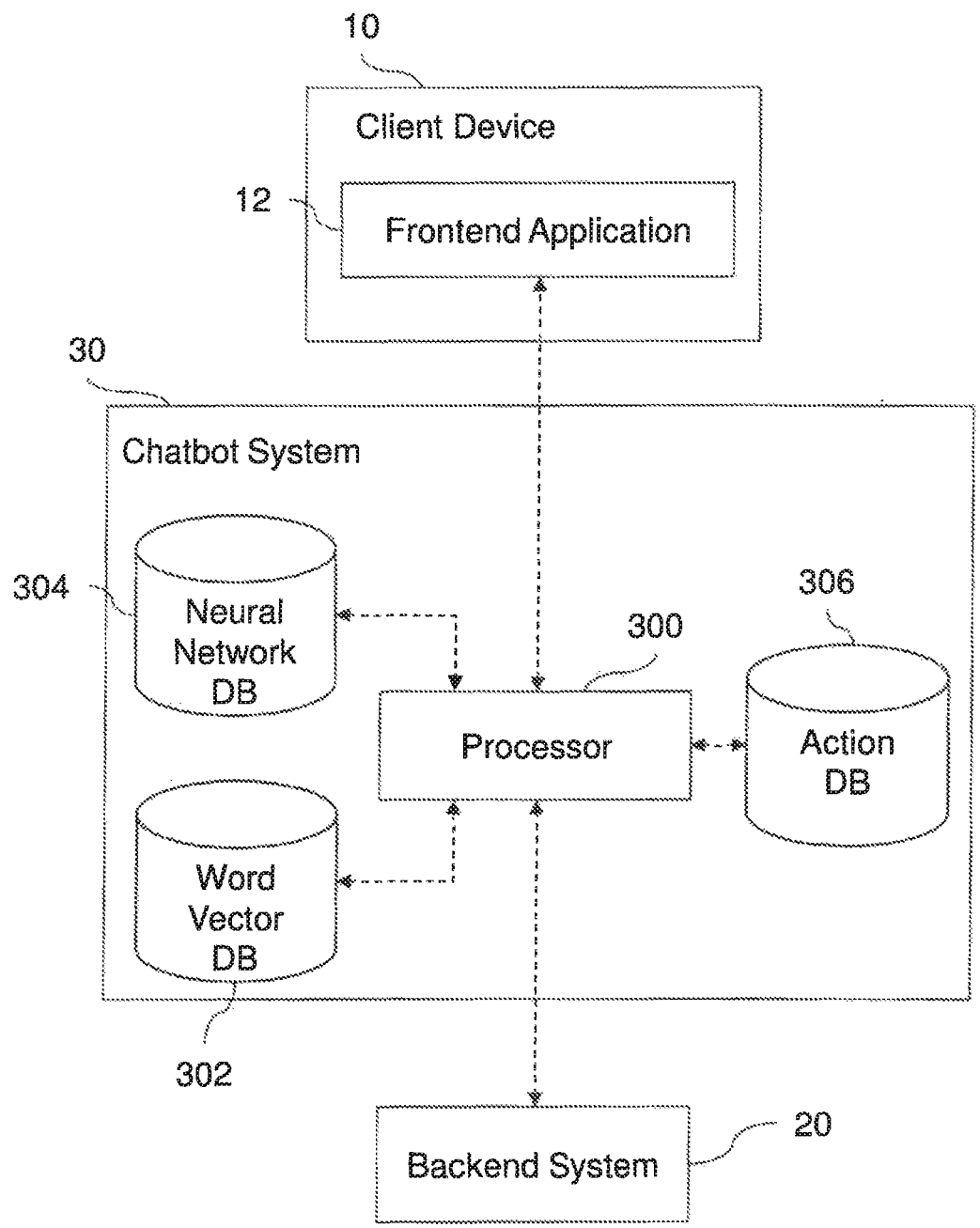
FIG. 2 shows an exemplary functional block diagram of the exemplary system shown in FIG. 1.

FIG. 2 shows an exemplary functional block diagram of the exemplary system shown in FIG. 1. As shown in FIG. 2, the chatbot system 30 may comprise a processor 300, a word vector database (DB) 302, a neural network DB 304 and an action DB 306.

The processor 300 can access the word vector DB 302, the neural network DB 304 and the action DB 306. Further, the processor 300 can communicate with the frontend application 12 and the backend system 20 via the network 40 (see also FIG. 1). The processor 300 may be configured to perform process necessary for providing an interface between the frontend application 12 of the client device 10 and the backend system 20.

For example, the processor 300 may be configured to receive a text input in a natural language via the frontend application 12 and perform computation using the received text input and a neural network. The neural network may be configured to receive as its input an input matrix obtained from the received text input and to generate an output vector representing an action to be performed by the backend system 20 in response to the received text input. The processor 300 may be further configured to identify the action represented by the output vector generated as a result of the computation using the neural network, communicate the identified action to the backend system 20 for the backend system 20 to perform the identified action and provide the frontend application 12 with a text output in the natural language based on the identified action.

The details of the exemplary process performed by the processor 300 and the exemplary configuration of the neural network will be described later.

The word vector DB 302 may be a database storing vector representations of words and (optionally) phrases that may appear in a text input (e.g., "vocabulary" for the text input). For example, for each of the words (and optionally also phrases) in the vocabulary, the word vector DB 302 may store a numeric vector (e.g., a list of real numbers) representing that word (or phrase) in relation to the other words in the vocabulary. Techniques of mapping words or phrases to vectors of real numbers may be referred to as word embedding. Such word (or phrase) vectors may be obtained, for example, by training a neural network according to word2vec model architecture developed by a team at Google led by Tomas Mikolov (see e.g., https://code.google.com/archive/p/word2vec/). Detailed explanations on the word2vec model and its training methods are provided in Tomas Mikolov, et al., "Efficient Estimation of Word Representations in Vector Space", In Proceedings of Workshop at ICLR, 2013; Tomas Mikolov, et al., "Distributed Representations of Words and Phrases and their Compositionality", In Proceedings of NIPS, 2013; and Xin Rong, "word2vec Parameter Learning Explained", November 2014 (available online at: https://arxiv.org/abs/1411.273v4). In some examples, the word vector DB 302 may store publicly-available vectors trained by Mikolov and his team on part of Google News dataset (about 100 billion words) which contain 300-dimensional vectors for 3 million words and phrases (see https://code.google.com/archive/p/word2vec/). The phrases may be obtained using a simple data-driven approach described in Tomas Mikolov, et al., "Distributed Representations of Words and Phrases and their Compositionality", In Proceedings of NIPS, 2013.

Upon receipt of a text input, the processor 300 may pre-process the text input for obtaining an input matrix to be used as an input to the neural network. For example, the processor 300 may apply stemming and padding process to the text input and retrieve, from the word vector DB 302, word vectors corresponding to the words included the received text input and generate an input matrix including the retrieved word vectors in the order of the corresponding words in the received text input. The input matrix may be used as an input to the neural network for computing an output vector representing an action to be performed by the backed system 20 in response to the received text input.

The neural network DB 304 may be a database storing data structures of neural networks with various configurations. For example, the neural network DB 304 may store the data structures of neural networks having an input layer with various numbers of nodes, one or more hidden layers with various numbers of nodes, an output layer with various numbers of nodes and various weighted connections between nodes. In some examples, the neural network DB 304 may store the data structure(s) of one or more of the neural networks having configurations as will be described later in detail with reference to FIGS. 6 to 8.

The action DB 306 may be a database storing data relating to actions to be taken by the backend system 20. For example, the action DB 306 may store a set of actions that can be performed by the backend system 20 in order to provide a particular service to the user of the client device 10. The action DB 306 may further store information indicating the correspondence between output vectors that can be obtained as a result of the computation using the neural network and the actions to be taken by the backend system 20. For example, in case an output vector includes a plurality of elements each of which corresponds to an action that may be performed by the backend system 20, the action DB 306 may store information which element of the output vector corresponds to which action of the backend system 20. The action DB 306 may further store possible text outputs which correspond to respective actions and which may be provided to the frontend application 12 in case the corresponding action is taken by the backend system.

The word vector DB 302, the neural network DB 304 and/or the action DB 306 are not necessarily included in the chatbot system 30. In some examples, the word vector DB 302, the neural network DB 304 and/or the action DB 306 may be provided outside the chatbot system 30 as long as the processor 300 of the chatbot system 30 has access to the respective databases.

Further, it should be noted that, although FIG. 2 shows a single processor 300, the chatbot system 30 may comprise more than one processors 300 for performing the process that will be described later in detail.

Neural Network Configuration

Figure 3:
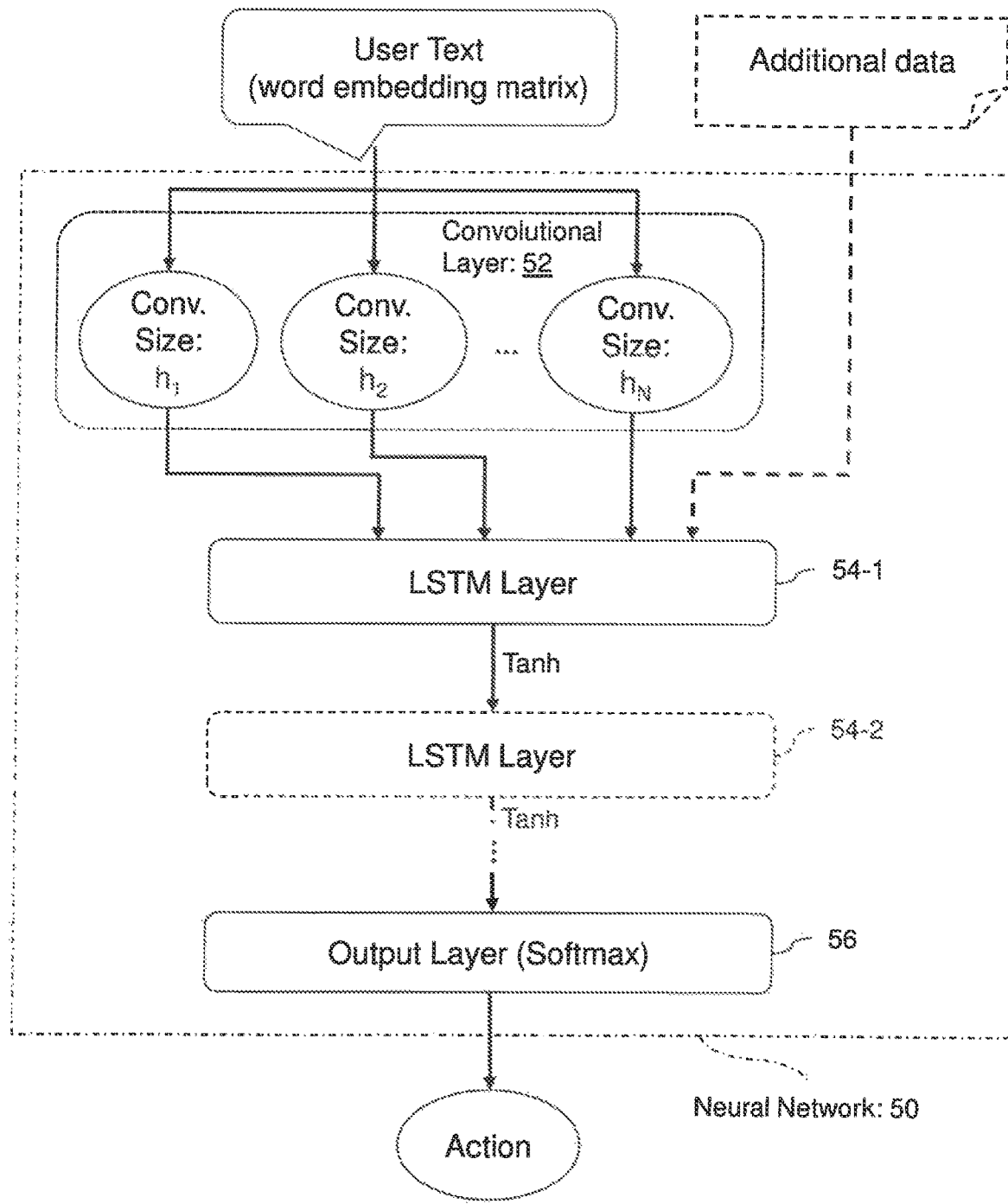
FIG. 3 shows an exemplary configuration of a neural network used in the system according to the present disclosure.

FIG. 3 shows an exemplary configuration of a neural network used in the system according to the present disclosure. The exemplary neural network 50 shown in FIG. 3 comprises a convolutional layer 52, one or more LSTM layers 54-1, 54-2, . . . (may be referred also to as LSTM layer(s) 54) and an output layer 56.

The convolutional layer 52 may receive a user text represented as a word embedding matrix as an input. The word embedding matrix may be an input matrix obtained from the text input received by the processor 300 of the chatbot system 30 via the frontend application 12 of the client device 10. The input matrix may be obtained by pre-processing the text input with reference to the word vector DB 302, as stated above.

The convolutional layer 52 may be configured to generate feature values by applying one or more filters to the input matrix. Each of the one or more filters may have a window size h corresponding to one or more words contained in the text input. In the example shown in FIG. 3, the convolutional layer 52 includes N filters of window sizes $h_m$ (m=1, 2, ..., N) respectively. The N filters may have different window sizes $h_m$. The number N of the filters may be a natural number which is greater than 0 and is smaller than the number of words included in the input matrix. The number N of the filters and the range of the window sizes $h_m$ may be variable.

Figure 4:
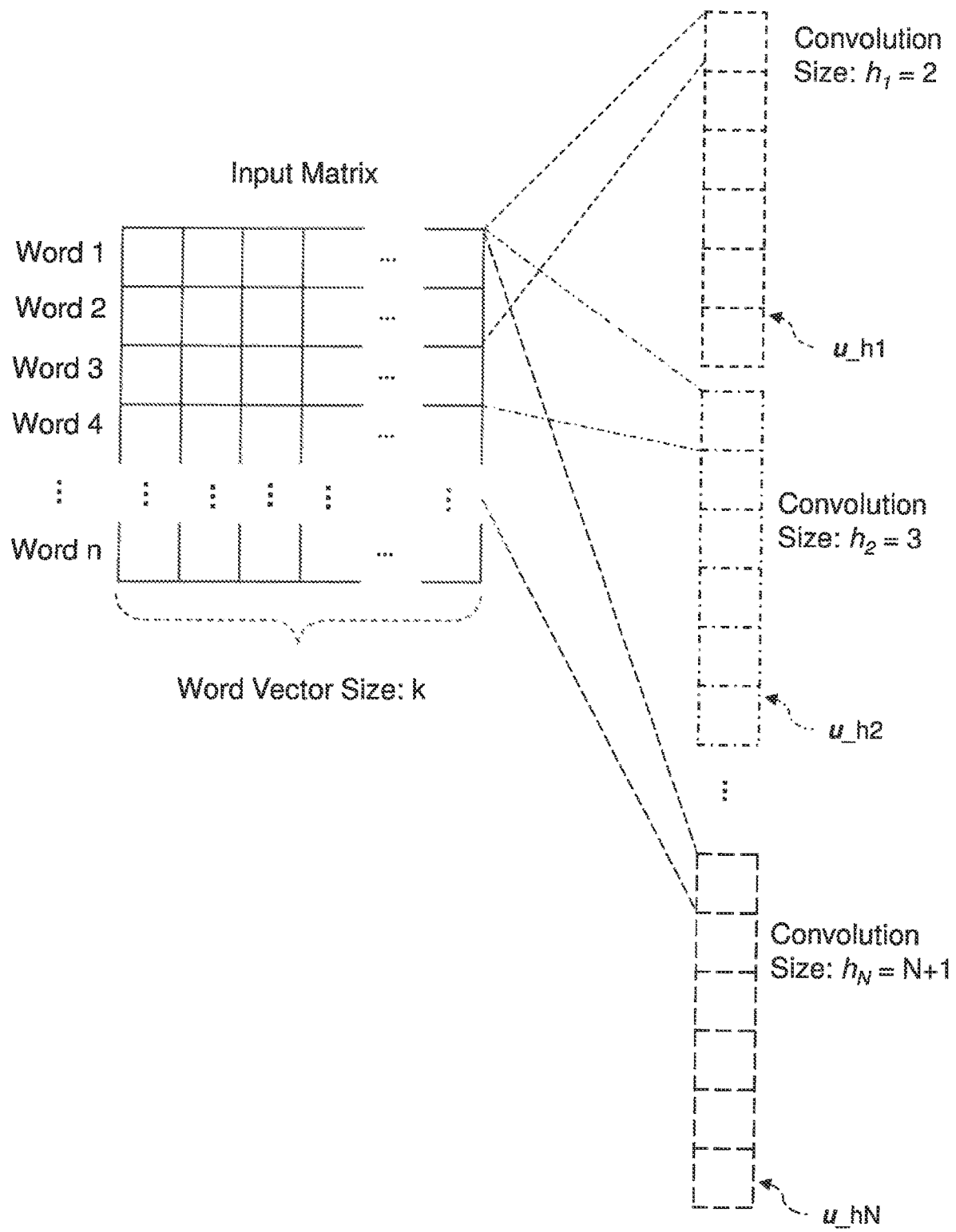
FIG. 4 shows a schematic diagram illustrating an exemplary input matrix and an exemplary configuration of a convolutional layer in the neural network used in the system according to the present disclosure.

FIG. 4 shows a schematic diagram illustrating an exemplary input matrix and an exemplary configuration of the convolutional layer 52 in the exemplary neural network 50 shown in FIG. 3. FIG. 4 shows an example where the window size $h_m$ of a filter m (=1, 2, ..., N) is $h_m$=m+1. In the example of FIG. 4, in case the number N of the filters is 3, the window sizes would be 2, 3 and 4 for the three filters, respectively. It should be noted, however, the number N of the filter is not limited to three and the window sizes of the filters may be different from the example shown in FIG. 4.

The exemplary input matrix shown in FIG. 4 may be an n×k matrix, which represents a text input, e.g. a sentence, including n words. Each row of the exemplary input matrix may correspond to a word included in the sentence and represent a word vector of size k for that word. The sentence represented by the n×k input matrix may also be represented as $$v_{1:n} = v_1 \oplus v_2 \oplus \ldots \oplus v_n, (v_i \in \mathbb{R}^k) \quad (1)$$

where $v_i$ may be the k-dimensional word vector corresponding to the i-th word in the sentence of the input text and $\oplus$ may be a concatenation operator. Let $v_{i:i+j}$ refer to a concatenation of words $v_i, v_{i+1}, \ldots, v_{i+j}$. A convolution operation performed at the convolutional layer 52 may apply a filter $w \in \mathbb{R}^{h,k}$ to the window size of $h_m$ words to generate feature values for that filter. For example, a feature value $u_i$ may be generated from a window of words $v_{i:i+hm-1}$ by $$u_i = f(w \cdot v_{i:i+hm-1} + b) \quad (2)$$

where $b \in \mathbb{R}$ may be a bias term and f may be a non-linear function such as the hyperbolic tangent. The filter may be applied to each possible window of words in the sentence $\{v_{1:hm}, v_{2:hm+1}, \ldots, v_{n-hm+1:n}\}$ to generate a feature map u including the feature values as follows:

$$u = [u_1, u_2, \ldots, u_{n-hm+1}] \quad (3)$$

where $u \in \mathbb{R}^{n+m}$. In case of applying the N filters of window sizes $h_1, h_2, \ldots, h_N$ to the input matrix as shown in the example of FIGS. 3 and 4, the following N feature maps corresponding to the N filters may be generated:

$$u\_h1 = [u_{1\_h1}, u_{2\_h1}, \ldots, u_{n-h1+1\_h1}] \quad (4)$$
$$u\_h2 = [u_{1\_h2}, u_{2\_h2}, \ldots, u_{n-h2+1\_h2}]$$
$$\ldots$$
$$u\_hN = [u_{1\_hN}, u_{2\_hN}, \ldots, u_{n-hN+1\_hN}].$$

The feature values in each of the feature maps as stated above may correspond to a k-gram model (k=$h_1, h_2, \ldots, h_N$) of the text input.

Referring again to FIG. 3, the feature values generated at the convolutional layer 52 may be passed on to the LSTM layer 54-1. For example, the feature values of the N feature maps as shown above in the expression (4) may be concatenated as follows:

$$[u_{1\_h1}, u_{2\_h1}, \ldots, u_{n\_h1}, u_{1\_h2}, \ldots, u_{2\_h2}, \ldots,$$
$$u_{n-1\_h2}, \ldots, u_{1\_hN}, u_{2\_hN}, \ldots, u_{n-N+1\_hN}] \quad (5)$$

to be used as an input (e.g. an input vector) to the LSTM layer 54-1.

The LSTM layer 54-1 may optionally receive, in addition to the feature values generated at the convolutional layer 52, additional data as a part of the input. The additional data may include values of additional input parameters relating to the service provided by the backend system 20. The additional input parameters may include, but are not limited to, entities extracted from the text input (e.g., catalog, quantities, time, day, addresses, etc.), user profile (e.g., gender, nationality, etc.), cart content (e.g. in case the service is an online shopping service), marketing promotions, weather forecasts, stock prices etc. The additional parameters may be parameters that can affect the decision outcome of a particular conversational step.

Figure 5:
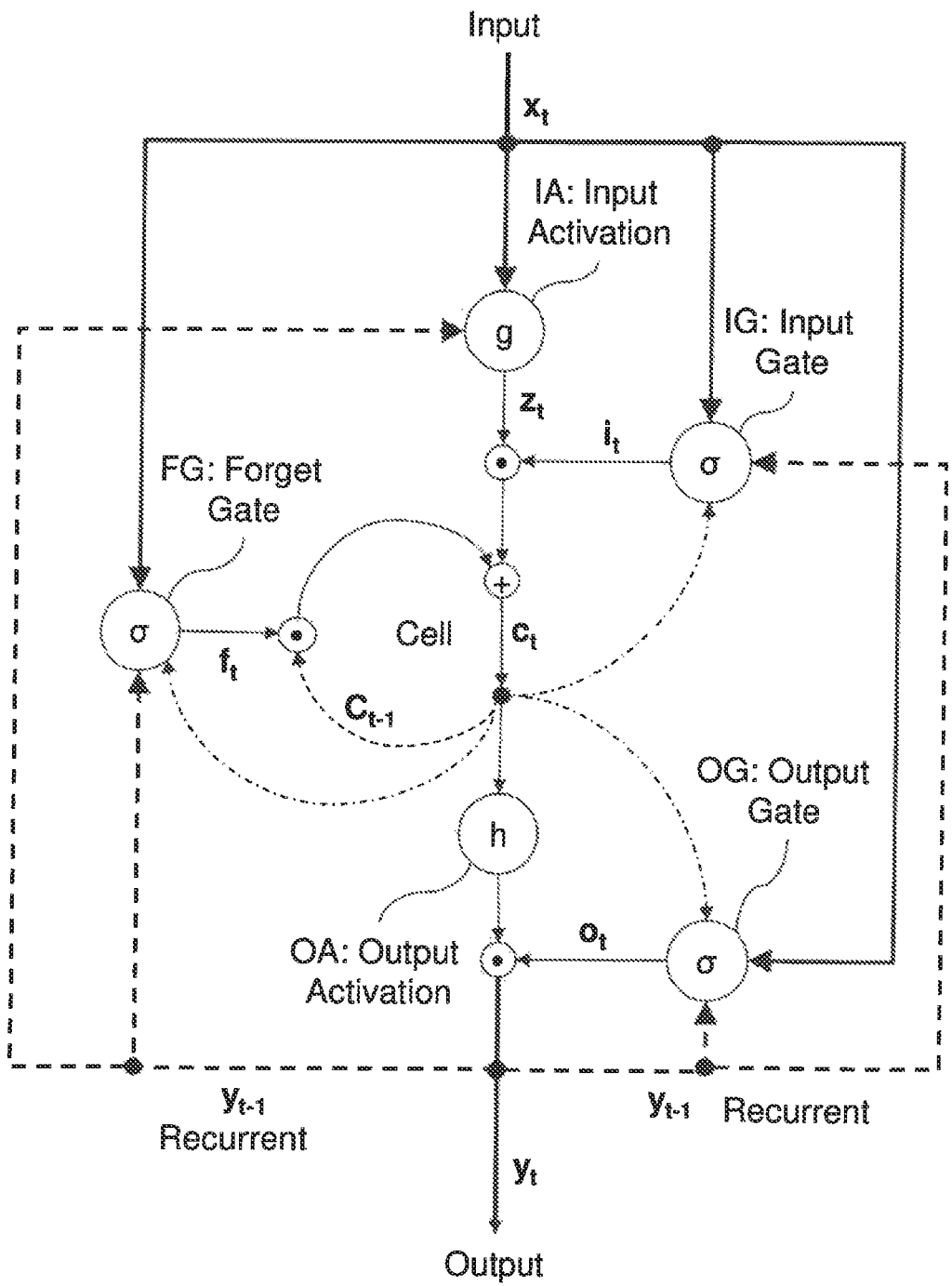
FIG. 5 shows an exemplary configuration of an LSTM block.

Referring now to FIG. 5, each of the one or more LSTM layers 54-1, 54-2, ... shown in FIG. 3 may comprise an LSTM block having an exemplary configuration as shown in FIG. 5. The LSTM block shown in FIG. 5 may comprise a cell, an input gate IG, an output gate OG and a forget gate FG. The LSTM block shown in FIG. 5 may receive an input $x_t$, e.g., a vector with $M_{in}$ elements ($M_{in}$=1, 2, 3, 4, ...), at a time step t and output an output $y_t$, e.g., a vector with $M_{out}$ elements ($M_{out}$=1, 2, 3, 4, ...), according to the following set of equations:

$$z_t = g(W_z x_t + R_z y_{t-1} + b_z)$$

$$i_t = \sigma(W_i x_t + R_i y_{t-1} + p_i \odot c_{t-1} + b_i)$$

$$f_t = \sigma(W_f x_t + R_f y_{t-1} + p_f \odot c_{t-1} + b_f)$$

$$c_t = z_t \odot i_t + c_{t-1} \odot f_t$$

$$o_t = \sigma(W_o x_t + R_o y_{t-1} + p_o \odot c_t + b_o)$$

$$y_t = h(c_t) \odot o_t \quad (6)$$

where each of the functions and parameters may indicate the following:
g: an input activation function that may be hyperbolic tangent;
σ: a gate activation function that may be logistic sigmoid;
h: an output activation function that may be hyperbolic tangent;
⊙: point-wise multiplication of two vectors;
$z_t$: a vector representing a squashed input;
$i_t$: an activation vector of the input gate IG;
$f_t$: an activation vector of the forget gate FG;
$c_t$: a cell state vector;
$o_t$: an activation vector of the output gate OG;
$W_z, W_i, W_f, W_o \in \mathbb{R}^{M_{out} \times M_{in}}$: input weight matrices;
$R_z, R_i, R_f, R_o \in \mathbb{R}^{M_{out} \times M_{out}}$: recurrent weight matrices;
$p_i, p_f, p_o \in \mathbb{R}^{M_{out}}$: peephole weight vectors;
$b_z, b_i, b_f, b_o \in \mathbb{R}^{M_{out}}$: bias vectors.

It is noted that connections with solid lines shown in FIG. 5 indicate flow of respective vectors of the current time step t. Further, connections with broken lines in FIG. 5 indicate flow of respective vectors of the previous time step t−1. In addition, connections with dashdotted lines indicate peephole connections to the input gate IG, forget gate FG and the output gate OG.

In some examples, the input $x_t$ to the LSTM layer 54-1 at time step t may be the concatenated feature values generated by the convolutional layer 52 with N filters (see equation (5) above), in response to the text input received at a time step t by the chatbot system 30. In further examples, the input $x_t$ may include values of the additional input parameters as stated above in addition to the concatenated feature values (Id.) output from the convolutional layer 52 at a time step t. In other words, in case $x_t$ includes the values of the additional input parameters, $x_t$ may be a vector obtained by concatenating the values of the additional input parameters and the concatenated feature values (Id.) output from the convolutional layer 52.

Further, in the above set of equations (6), $y_{t-1}$ and $c_{t-1}$ may indicate the output and the cell state vector at a previous time step t-1.

Referring again to FIG. 3, the output $y_t$ of the LSTM layer 54-1 at time step t computed according to the above-stated equations using the LSTM block (of FIG. 5) may be fed to the second LSTM layer 54-2 as an input and analogous computations according to the above set of equations (6) may be performed at the second LSTM layer 54-2. Subsequent LSTM layers may further perform the analogous computations using the output by the previous LSTM layer as the input.

The output from the last LSTM layer included in the exemplary neural network 50 may be fed to the output layer 56. In case the exemplary neural network 50 comprises a single LSTM layer 54-1, the output $y_t$ from the LSTM layer 54-1 may be fed to the output layer 56.

The output layer 56 may be a softmax layer configured to provide an output vector representing an action to be performed by the backend system 20 in response to the text input received by the chatbot system 30. For example, the output layer 56 may include a plurality of nodes having a softmax function as the activation function. In some examples, the output layer 56 may be a fully connected layer where each node of the output layer 56 is connected to all the elements (e.g. nodes, values) of the output from the LSTM layer connected to the output layer 56. Each node of the output layer 56 may correspond to an action that can be performed by the backend system 20 and may output a value indicating likelihood that the corresponding action should be taken in response to the text input received by the chatbot system 30. Accordingly, the output vector output from the output layer 56 may include values representing likelihood that the respective actions should be performed. The action corresponding to the highest likelihood value in the output vector may be identified as the action to be performed by the backend system 20. In case the output vector includes more than one elements with the same highest likelihood value, the action to be performed may be chosen randomly or according to a predefined rule among the actions corresponding to the elements of the output vector with the highest likelihood value. The identified action may be communicated to the backend system 20 by the processor 300 of the chatbot system and a text output in a natural language may be provided to the frontend application 12 of the client device 10 based on the identified action.

In some examples, the output layer 56 may include, in addition to the nodes corresponding to possible actions to be taken by the backend system 20, nodes corresponding to at least one further feature related to one or more of the possible actions. A further feature related to an action may be, for example, sub-actions or entity related to that specific action. For instance, in case one of the possible actions is "to buy" (e.g., the backend system 20 performs processing that enables a user to purchase an object via an online shop), a further feature relating to the action "to buy" may be the object of the purchase (e.g., car, bicycle, smartphone, tablet computer, home electric appliance, clothes, grocery etc.). Nodes corresponding to values of the at least one feature (e.g., each node corresponding to a specific object of purchase) may be included in the output layer 56. In the examples where the output layer 56 includes not only nodes corresponding to possible actions but also nodes corresponding to the at least one further feature relating to one or more of the possible actions, the output vector output from the output layer 56 may include likelihood values for the possible actions and for values of the at least one further feature. Also in this case, the action to be performed by the backend system 20 may be determined in the same manner as stated above. Additionally, the at least one further feature relating to the identified action may be determined using the likelihood values for the values of the at least one further feature included in the output vector. For example, the value of the at least one further feature with the highest likelihood value may be identified as the value of the feature relating to the identified action. Further, for example, in case the output vector includes more than one elements corresponding to values of the at least one further feature with the same highest likelihood value, a value of the at least one further feature may be chosen randomly or according to a predefined rule among the values of the at least one further feature corresponding to the elements with the same highest likelihood value.

Figure 11:
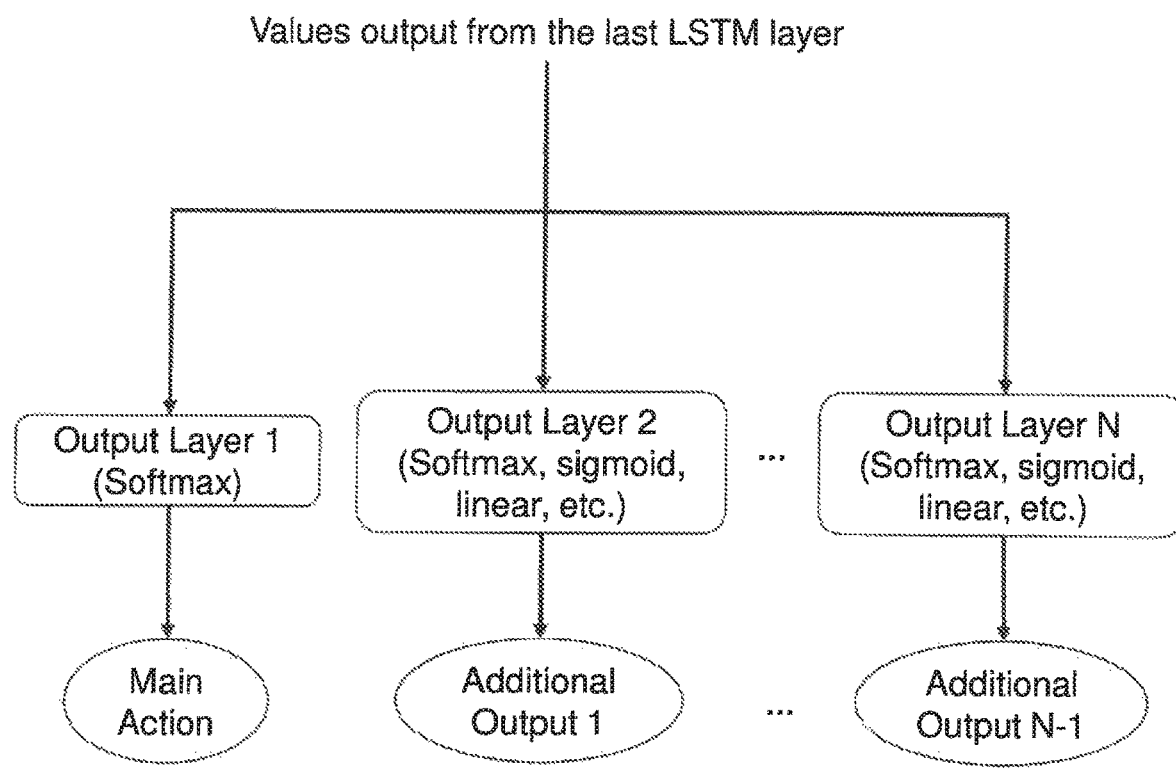
FIG. 11 shows an exemplary configuration of an output layer of the neural network according to the present disclosure.

In the examples where at least one further feature relating to the identified action is determined, the output layer of the neural network 50 may have a configuration as shown in FIG. 11. As can be seen from FIG. 11, N (=2, 3, . . . ) outputs may be defined for the neural network 50. Specifically, for example, N output (sub-) layers corresponding to the N outputs may be defined. The N output (sub-) layers may be configured with softmax, sigmoid or linear functions. The (sub-) layer corresponding to the output representing the main action may have a softmax activation function, since the output action may be discriminative among all possible actions. Other outputs, e.g. additional outputs, may have different activation functions, depending on necessities. Accordingly, the neural network 50 may have a flexible core architecture which can be adapted to any scenario.

In the exemplary neural network 50 as described above with reference to FIGS. 3 to 5, the convolutional layer 52 may be considered as extracting features of the text input by the user in a natural language and the one or more LSTM layers 54 may be considered as determining a next action to be performed in response to the text input in the context of a sequence of text inputs (e.g., user utterances in a conversation between the user and the chatbot). The classification capability of the convolutional layer 52 as well as the time-series and/or sequential nature of data managed by the LSTM layer(s) may enable the chatbot system 30 to determine the purpose of an utterance of a user related to the context of the current conversation. Accordingly, the chatbot system 30 may be considered as modeling conversational sequences in a stochastic manner using ML and NLP techniques.

Figure 6:
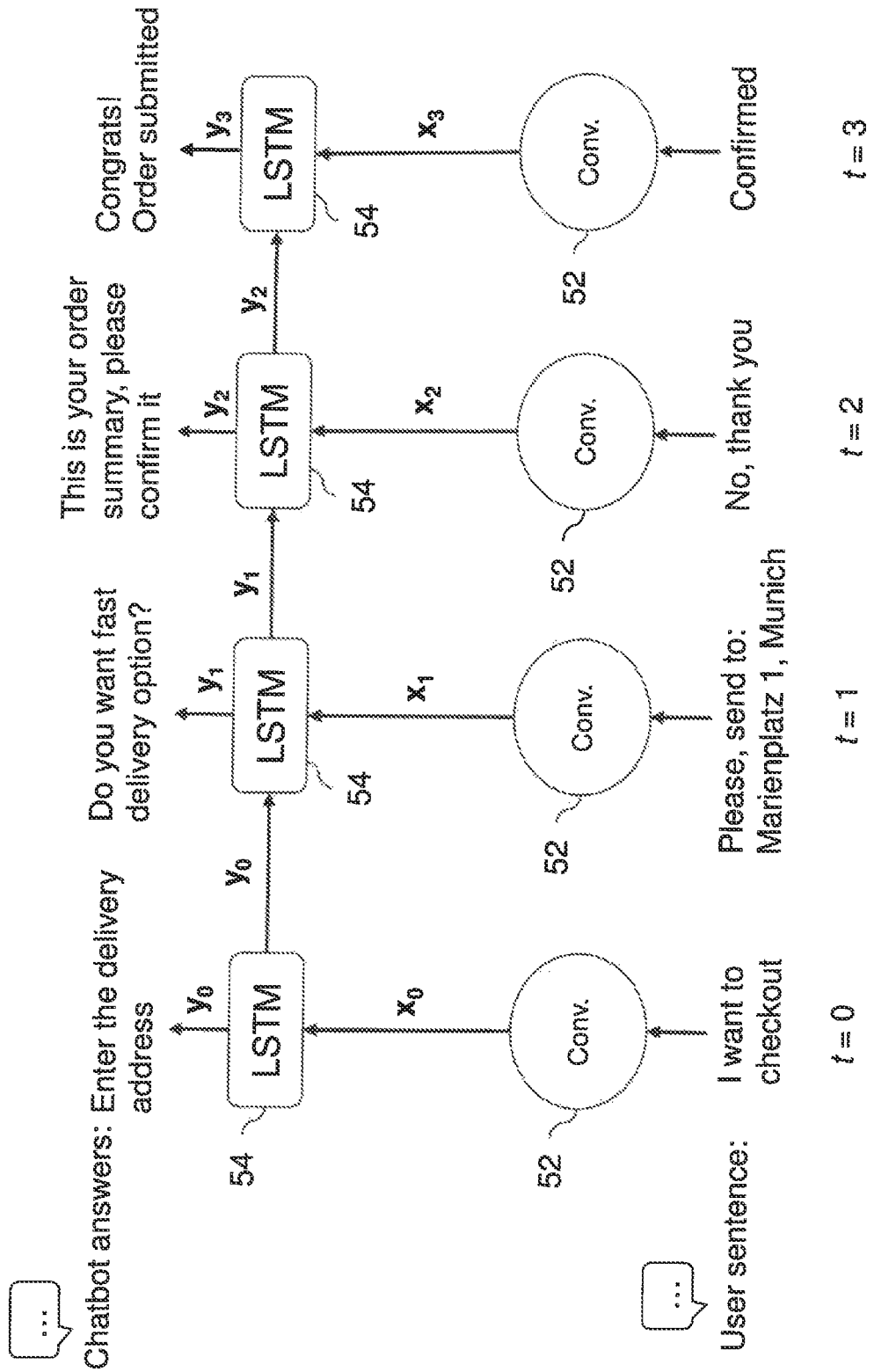
FIG. 6 shows a schematic diagram illustrating an example of an input sequence and an output sequence for the neural network having the exemplary configuration shown in FIG. 3.

FIG. 6 shows a schematic diagram illustrating an example of an input sequence and an output sequence concerning the exemplary neural network 50 shown in FIG. 3. The example shown in FIG. 6 may relate to a check-out procedure for an online shopping service provided by the backend system 20. In FIG. 6, the LSTM layer 54 shown in FIG. 3 has been unrolled with regards to text inputs by the user at time steps t=0, 1, 2 and 3. It should be noted that, although each of the convolutional layer 52 and the LSTM layer 54 is represented by a single component in FIG. 6, each of the convolutional layer 52 and the LSTM layer 54 may have the same configuration (e.g., with N filters in the convolutional layer 52 and one or more LSTM layers 54-1, 54-2, . . . ) as described above with reference to FIGS. 3 to 5. As can be seen from FIG. 6, a text input by the user (e.g. user sentence) at a time step t=0 may be processed (after pre-processing as necessary) at the convolutional layer 52 and the output of the convolutional layer 52 may be fed to the LSTM layer 54 as an input $x_0$. The output $y_0$ of the LSTM layer 54 may be used for determining a text output (e.g. an answer) from the chatbot in response to the user sentence at the time step t=0. Further, the output $y_0$ of the LSTM layer 54 may be fed to the LSTM layer 54 as a recurrent input at the next time step t=1. At the time step t=1, the convolutional layer 52 may feed its output $x_1$ to the LSTM layer 54 as an input. The LSTM layer 54 may provide an output $y_1$ using the input $x_1$ and the output $y_0$ of the previous time step t=0. The output $y_1$ may be used for determining the text output from the chatbot and may be fed to the LSTM layer 54 at the next time step t=2. The processing of the subsequent time steps t=2 and 3 may be performed in a manner analogous to that for the time steps t=0 and 1.

Figure 7:
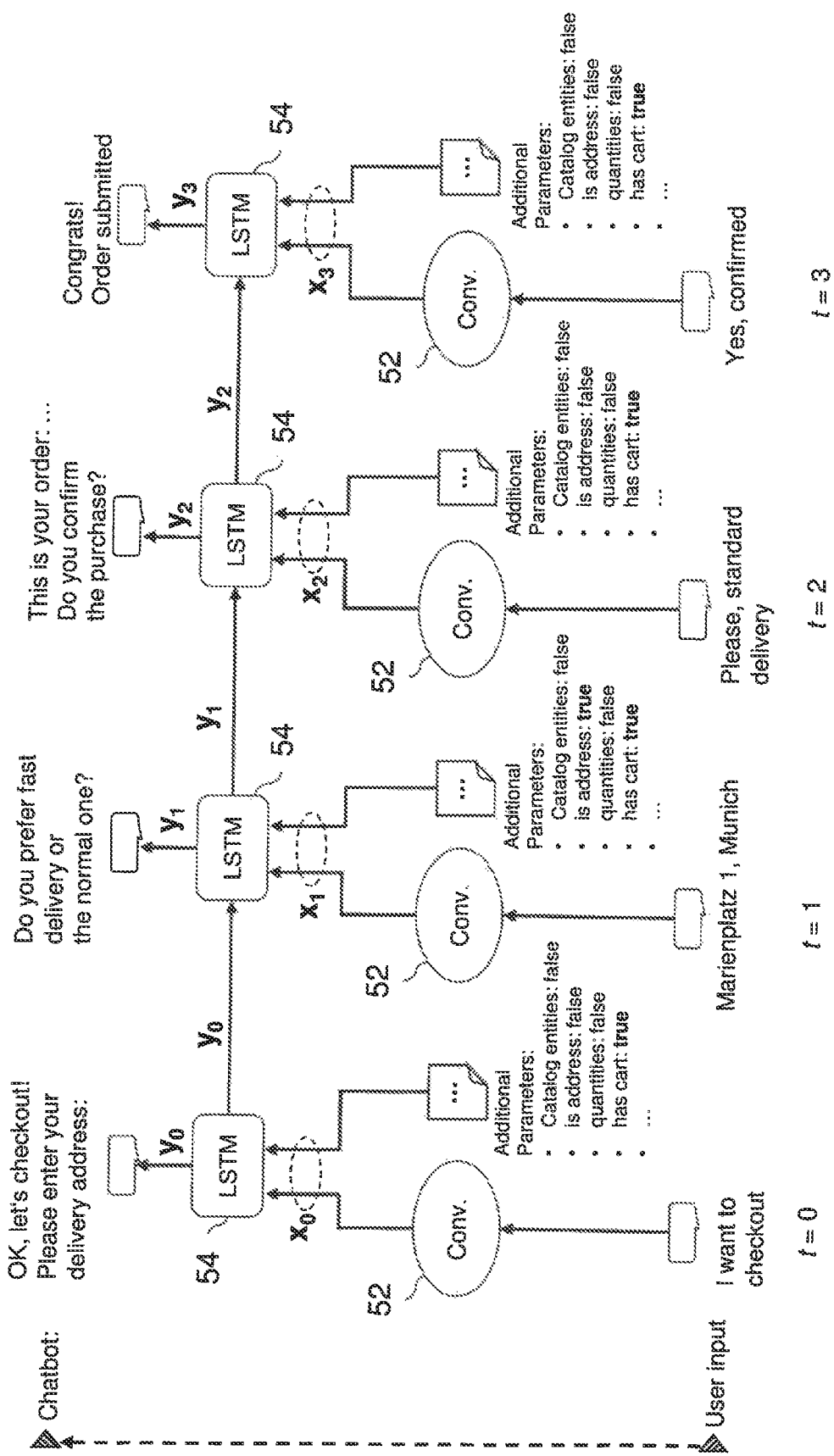
FIG. 7 shows a schematic diagram illustrating another example of an input sequence and an output sequence for the neural network having the exemplary configuration shown in FIG. 3.

FIG. 7 shows a schematic diagram illustrating another example of an input sequence and an output sequence for the exemplary neural network 50 shown in FIG. 3. The example shown in FIG. 7 may be considered to be analogous to that shown in FIG. 6 except that the LSTM layer 54 may receive not only the output from the convolutional layer 52 but also values of additional parameters relating to the online shopping service provided by the backend system 20. Accordingly, each of the inputs $x_0$, $x_1$, $x_2$ and $x_3$ to the LSTM layer 54 may be a vector obtained by concatenating the feature values output by the convolutional layer 52 and the values of the additional parameters.

Figure 8:
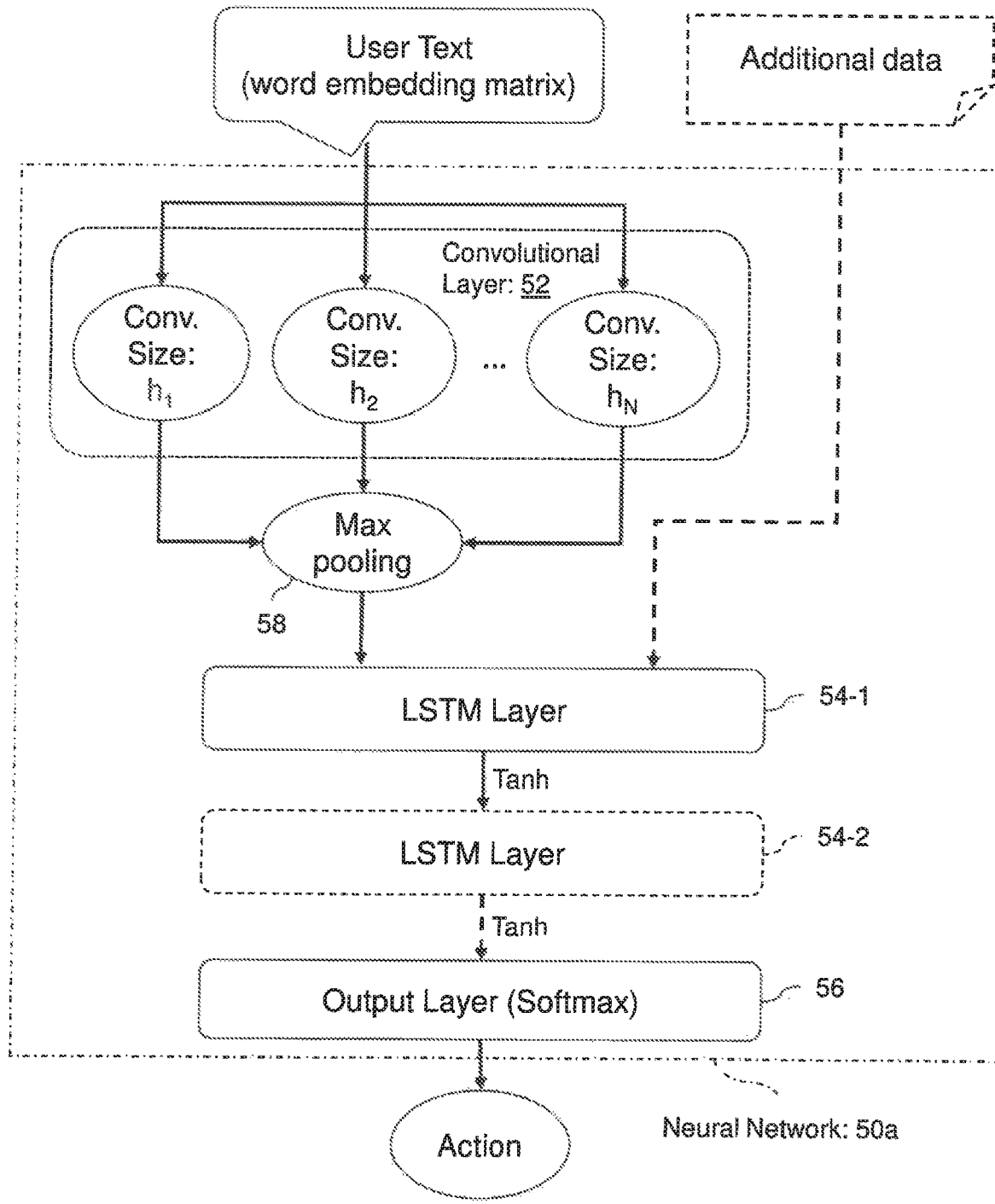
FIG. 8 shows another exemplary configuration of a neural network used in the system according to the present disclosure.

FIG. 8 shows another exemplary configuration of a neural network used in the system according to the present disclosure. In FIG. 8, elements identical to those shown in FIG. 3 are assigned to identical reference signs and detailed explanations thereof will be omitted. The exemplary neural network 50a shown in FIG. 8 may comprise a max-pooling layer 58 between the convolutional layer 52 and the LSTM layer 54-1. The max-pooling layer 58 may be configured to perform a max-pooling operation to the feature values generated by the convolutional layer 52. The max-pooling operation may be an operation to select the maximum value from among a group of values. Thus, the max-pooling operation may provide down-sampling of the values.

The max-pooling layer 58 may receive the feature values $[u_{1\_h1}, u_{2\_h1}, \ldots, u_{n\_h1}, u_{1\_h2}, u_{2\_h2}, \ldots, u_{n-1\_h2}, \ldots, u_{1\_hN}, u_{2\_hN}, \ldots, u_{n-N+1\_hN}]$ generated at the convolutional layer 52 by applying the N filters (see above equation (5); see also, FIG. 4). The max-pooling layer 58 may, for example, apply the max-pooling operation to each group of feature values resulting from the same filter and obtain N values each corresponding to N filters. In other words, in this example, for a filter k (k=1, 2, 3, . . . , N), the maximum value among the feature values generated by applying the filter k at the convolutional layer 52 may be selected as the result of the max-pooling operation. In some examples, the max-pooling layer 58 may divide the feature values resulting from a filter k (k=1, 2, 3, . . . , N) into L groups (L=2, 3, . . . , $L_k$; $L_k$ being less than half of the number of feature values resulting from the filter k) and apply the max-pooling operation to each of the L groups of feature values. In such exemplary cases, L feature values may be selected from the feature values resulting from each of the filters 1, 2, . . . , N. After applying the max-pooling operation as in one of the examples stated above, the max-pooling layer 58 may feed the selected feature values to the LSTM layer 54-1 as the input to the LSTM layer 54-1.

Hereinafter, the neural network employed by the chatbot system 30 is simply referred to as the neural network 50. It should be noted, however, that the neural network 50 referred to hereinafter may either be the exemplary neural network 50 shown in FIG. 3 or the exemplary neural network 50a shown in FIG. 8.

Initial Setup and Training of the Neural Network

In order to set up the chatbot system 30 for a particular service of a particular backend system 20 for the first time, the neural network 50 may need to be trained with training data including sequences of possible text inputs and actions to be performed by the backend system 20 in response to each possible text input. In some example, the training data may be synthetically generated by, e.g., a provider of the service and/or a developer of the backend system 20 and/or the chatbot system 30. Alternatively or additionally, the training data may be collected by monitoring interactions between users and the backend system 20 regarding the service.

Figure 9:
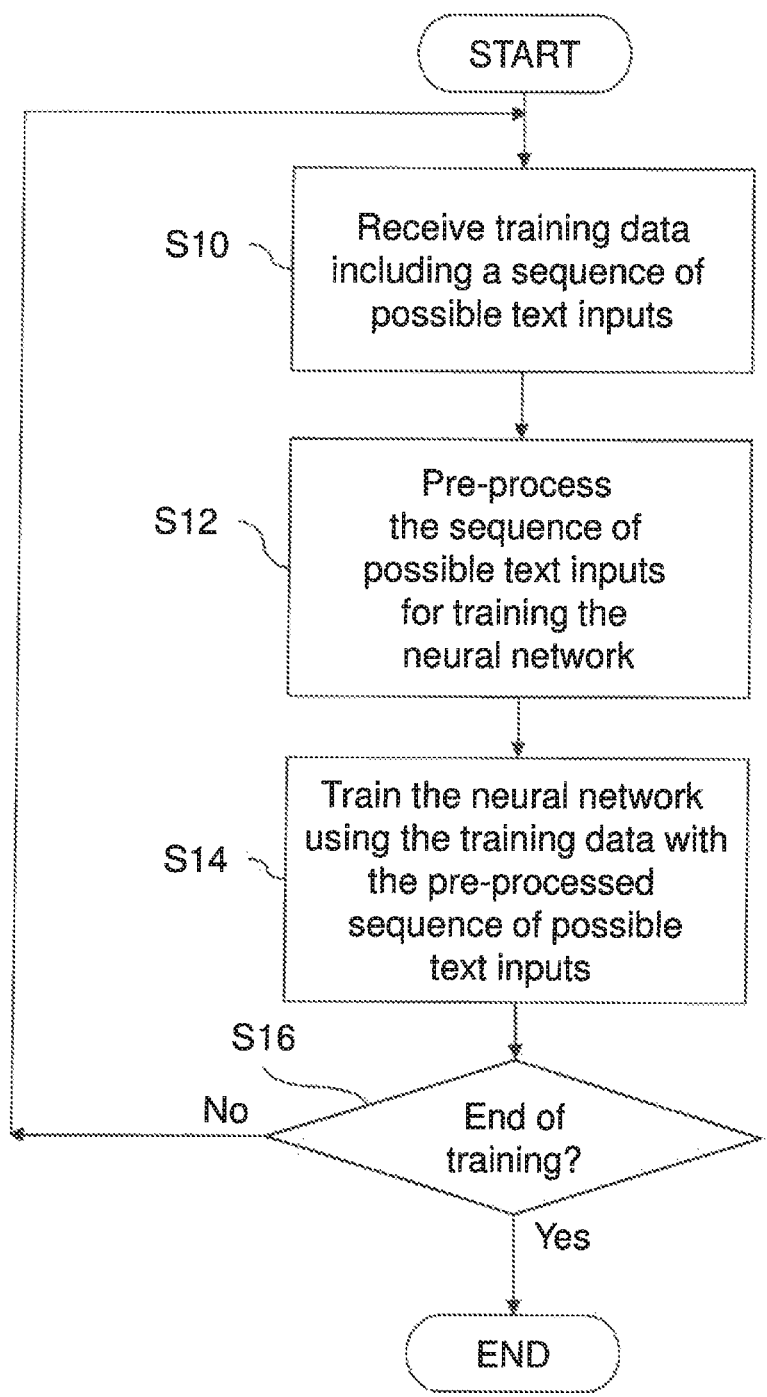
FIG. 9 shows a flowchart of an exemplary processing for training the neural network according to the present disclosure.

FIG. 9 shows a flowchart of an exemplary processing for training the neural network 50 to be used by the chatbot system 30. The exemplary processing shown in FIG. 9 may be performed by the processor 300 of the chatbot system 30 (see e.g., FIG. 2). The exemplary processing shown in FIG. 9 may be started, for example, when the chatbot system 30 receives an instruction to start training the neural network of the chatbot system 30.

At step S10, the processor 300 may receive training data including a sequence of possible text inputs and information indicating an action to be taken by the backend system 20 in response to each of the possible text inputs. The training data may further comprise a set of additional input parameters to be processed by the LSTM layer(s) 54 together with each of the possible text inputs.

The following provides exemplary sequences of possible text inputs, actions to be taken and values of additional input parameters that may be included in the training data. The following exemplary sequences 1 and 2 relate to a checkout process for an online shopping service that may be provided by the backend system 20.

[Exemplary Sequence 1]
    checkout_ask_address;false;false;false;Let's buy all that stuff
    checkout_ask_method;false;false;true;Marienplatz 1, Munich
    checkout_confirm;false;false;false;Please, the standard one
    checkout_done;false;false;false;Sure

[Exemplary Sequence 2]
    checkout_ask_address;false;false;false;I want to checkout
    checkout_ask_address;false;false;false;What I should do?
    checkout_ask_method;false;false;true;Ah ok:-) Marienplatz 1, Munich
    search;true;false;false;I want also some beer
    add_cart;false;false;false;Add it to the cart please
    checkout_ask_method;false;false;false;Fast delivery
    checkout_done;false;false;false;Yes, confirmed The exemplary sequences 1 and 2 as indicated above are in accordance with the following syntax:
    #action;contains_catalog_entities;contains_date;contain_address;user_text The element "#action" may represent an expected action to be taken by the backend system in response to the text input from the user represented by the element "user_text". A list of actions that may be performed by the backend system 20 regarding the service in question may be pre-defined by, e.g. the provider of the service and/or a developer of the backend system 20 and may be stored in the action DB 306. The elements "contains_catalog_entities", "contains_date" and "contain_address" represent additional input parameters. The values of the additional input parameters may be determined by, for example, analyzing the text input and/or may be obtained from the backend system 20 or any other source of information concerning the parameter(s).

In case the output from the neural network 50 is desired to represent not only an action to be taken by the backend system 20 but also at least one further feature of that action (e.g., sub-actions or entities related to the action), the training data may also include information indicating the expected value(s) of the at least one further feature for one or more of the actions to be taken in response to the possible text inputs. The possible values of the at least one further feature relating to one or more actions may be stored in the action DB 306.

Next, at step S12, the processor 300 may pre-process the sequence of possible text inputs received in step S10 for training the neural network. For example, the processor 300 may convert the possible text inputs into a format suitable for use as inputs to the neural network. More specifically, for instance, the processor 300 may apply stemming to the possible text inputs in order to reduce the words contained in the possible text inputs into word stems. Further, the processor 300 may apply padding process to each possible text input for all the possible text inputs to have an identical length, e.g. to include identical number of words. The length of the padded text inputs (e.g. the number of words included in each padded text input) may be predetermined or predeterminable by, e.g. the developer of the backend system and/or the chatbot system 30. In addition, the processor 300 may generate an input matrix (see e.g., FIG. 4) for each possible text input by retrieving word vectors corresponding the words included in the text input from the word vector DB 302 as described above with reference to FIG. 2.

At step S14, the processor 300 may train the neural network 50 using the training data with the pre-processed sequence of possible text inputs. The training of the neural network 50 may be performed by adjusting the weights of connections between nodes in the convolutional layer 52 and the LSTM layer(s) 54 using the training data according to a backpropagation method. Further, the training of the LSTM layer(s) 54 may be performed using a backpropagation through time (BTT) method. The adjusted weight values may be stored in the neural network DB 304. In some examples, when training the neural network 50 at step S14, the processor 300 may use only a part of the training data received at step S10 and use the other part of the training data received at step S10 for assessing the progress of the training. The part of the training data used for assessing the progress of the training may be considered as a test set or validation set.

At step S16, the processor 300 may determine whether the training process should end. For example, the processor 300 may perform computation using the neural network 50 with a the test set or validation set as stated above and determine that the training process should end when a percentage of "correct" outputs (e.g. intended actions in response to particular text inputs) from the neural network 50 exceeds a predetermined or predeteminable threshold.

In case the processor 300 determines that the training process should continue (No at step S16), the processing may return to step S10. In case the processor 300 determines that the training process should end (Yes at step S16), the processing shown in FIG. 9 may end.

The training processing as shown in FIG. 9 may enable the chatbot system 30 to automatically learn how to predict similar sequence of user utterances by simply providing sample sequences to the chatbot system 30.

Process for Providing a Chatbot Interface

After the training of the neural network 50 of the chatbot system 30, the chatbot system 30 may provide an interface between the client device 10 and the backend system 20. In some examples, the chatbot system 30 may provide such an interface only with one or more users of the client device 10 who have explicitly allowed the chatbot system 30 to access the frontend application 12 of the client device 10 with respect to the service provided by the backend system 20. In these examples, a notification indicating a user allowing the chatbot system 30 to access the frontend application 12 may be sent from the client device 10 to the chatbot system 30 upon instruction by the user.

Figure 10:
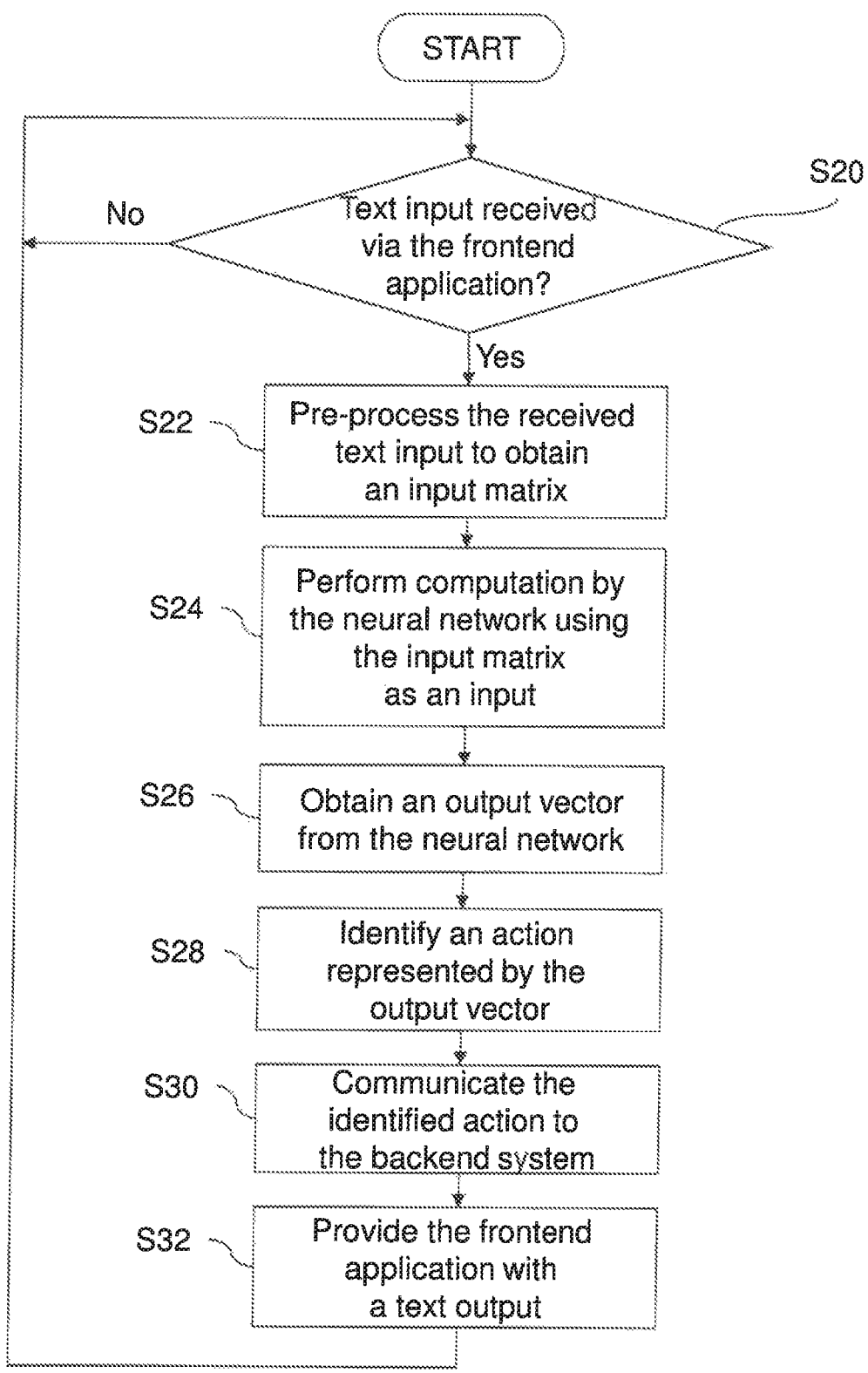
FIG. 10 shows a flowchart of an exemplary processing for providing an interface between the frontend application and the backend application.

FIG. 10 shows a flowchart of an exemplary processing for providing an interface between the frontend application and the backend system. The exemplary processing shown in FIG. 10 may be performed by the processor 300 of the chatbot system 30. The exemplary processing shown in FIG. 10 may start upon instruction from the service provider or the developer of the chatbot system 30, for example.

At step S20, the processor 300 may determine whether or not a text input is received via the frontend application 12 of the client device 10. In case the processor 300 has not received the text input (No at step S20), the processor 300 may perform the determination of step S20 again. In case the processor 300 has received the text input (Yes in step S20), the processing may proceed to step S22.

At step S22, the processor 300 may pre-process the received text input to obtain an input matrix. Specifically, for example, the processor 300 may perform stemming and padding to the received text input and then retrieve word vectors corresponding to the words contained in the received text input from the word vector DB 302. The input matrix may be generated from the retrieved word vectors. The generation of the input matrix performed at step S22 may be performed in a manner analogous to that at step S12 in FIG. 9.

Further, in the examples where the LSTM layer(s) 54 use the additional input parameters (see e.g., FIGS. 3, 7 and 8) for generating output values, the processor 300 may obtain values of the additional input parameters also at step S22. For example, in case one or more of the additional input parameters indicate whether or not certain information is included in the received text input, the value(s) of the additional input parameters may be obtained by analyzing the received text input. Further, for example, in case one or more of the additional input parameters relate to information that can be obtained from the backend system 20 and/or any other source of information (e.g., website(s) external to the backend system 20), the processor 300 may access the backend system 20 and/or the relevant source of information and obtain the value(s) of such (an) additional input parameter(s).

At step S24, the processor 300 may perform computation by the neural network 50 using the input matrix as an input to the neural network 50. For example, the processor 300 may access the neural network DB 304 and use the weight values of the neural network 50 stored in the neural network DB 304 to perform the computation. In the examples where the LSTM layer(s) 54 use the additional input parameters, the processor 300 may perform the computation using also the values of the additional input parameters obtained at step S22 as mentioned above.

At step S26, the processor 300 may obtain an output vector from the neural network 50. The output vector may be output from the output layer 56 of the neural network 50 as shown in FIGS. 3 and 8. The output vector may include values representing likelihood that the respective actions should be performed.

At step S28, the processor 300 may identify an action represented by the output vector obtained at step S26. For example, the processor 300 may access the action DB 306 and retrieve information indicating an action corresponding to the highest likelihood value in the output vector obtained at step S26. The action corresponding to the highest likelihood value in the output vector may be identified as the action represented by the output vector. In some examples, the processor 300 may further identify, at step S28, a value of at least one further feature relating to the identified action. For instance, the processor 300 may access the action DB 306 and retrieve information indicating the value of the at least one further feature, corresponding to the highest likelihood value for the at least one further feature in the output vector.

At step S30, the processor 300 may communicate the identified action to the backend system 20. In case the value of the at least one further feature relating to the identified action has also been identified, the processor 300 may further communicate the identified value of the at least one further feature. The backend system 20 may perform the identified action in response to the communication from the processor 300 notifying the identified action.

At step S32, the processor 300 may provide the frontend application 12 with a text output based on the identified action. For example, the processor 300 may access the action DB 306 and retrieve a text output that is stored in correspondence with the identified action. The retrieved text output may be provided to the frontend application 12 via the network 40. Additionally or alternatively, in some examples where the identified action involves providing information (e.g., in a text format) to the user from the backend system 20, the processor 300 may wait for a response from the backend system 20 to obtain the information to be provided to the user. Upon receipt of the information from the backend system 20, the processor 30 may provide the received information to the frontend application 12 via the network 40. Further, in case the value of the at least one further feature relating to the identified action has been identified, a part of the text output may indicate the identified value.

After step S32, the processing may return to step S20.

In some examples, further training of the neural network 50 may also be performed as the exemplary processing of FIG. 10 is performed. For instance, the processor 300 of the chatbot system 30 may send a message to the user via the frontend application 12 requesting the user to enter evaluation of the output text(s) of the chatbot system 30 and may receive the evaluation entered by the user via the frontend application 12. Subsequently, the processor 300 may train the neural network 50 using the text input received at step S22, (optionally) values of the additional input parameters obtained at step S22 and the action identified at step S28 as well as the evaluation entered by the user with respect to the text output based on the identified action.

By performing further training of the neural network 50 as the exemplary processing of FIG. 10 is performed, new cases (e.g. sequences of input texts and corresponding actions) may be iteratively added to the system and modification(s) to the process, e.g., conversational workflow implemented by the chatbot system 30, may be made without changing what is already in place. Thus, variations of conversational workflows may be easily applied and the number of the variations can increase without adding complexity in the overall system since the conversational workflows may be implemented with the neural network 50 used by the chatbot system 30.

Variations

It should be appreciated by those skilled in the art that the exemplary embodiments and their variations as described above with reference to FIGS. 1 to 10 are merely exemplary and other embodiments and variations may exist.

For example, the neural network 50 may have a configuration different from the examples described above with reference to FIGS. 3 to 8. For instance, although the convolutional layer 52 as shown in FIG. 4 employ a single channel of input, a multichannel architecture may also be employed as is described in, for example, Yoon Kim, "Convolutional Neural Networks for Sentence Classification", Sep. 3, 2014 (available online at: https://arxiv.org/abs/1408.5882).

Further, for example, the LSTM layer(s) 54 may have a configuration different from that shown in FIG. 5. For instance, one or more of the peephole connections shown in FIG. 5 with dashdotted lines may be omitted. In case one or more of the peephole connections are omitted, the corresponding term(s) including the peephole weight vectors in the set of equations (6) are omitted in the computation using the LSTM layer(s) 54. Details of the variants of the LSTM may be found, for example, in Klaus Greff et al., "LSTM: A Search Space Odyssey", IEEE Transactions on Neural Networks and Learning Systems, Volume: 28, Issue: 10, Oct. 2017, p. 2222-2232 (available online at: https://arxiv.org/abs/1503.04069).

Further, for example, the frontend application 12 may further be configured to receive audio input (e.g. speech) from the user and perform speech to text conversion on the user input. The frontend application 12 may then provide the chatbot system 30 with the text converted from the user input in speech. Additionally or alternatively, the frontend application 12 may be configured to perform text to speech conversion on the output text provided from the chatbot system 30 and provide the converted speech to the user.

Further, although the backend system 20 and the chatbot system 30 have been described above as separate systems, in some other examples, the functionalities of the backend system 20 and the chatbot system 30 as stated above may be integrated into a single system.

Hardware Configuration

Figure 12:
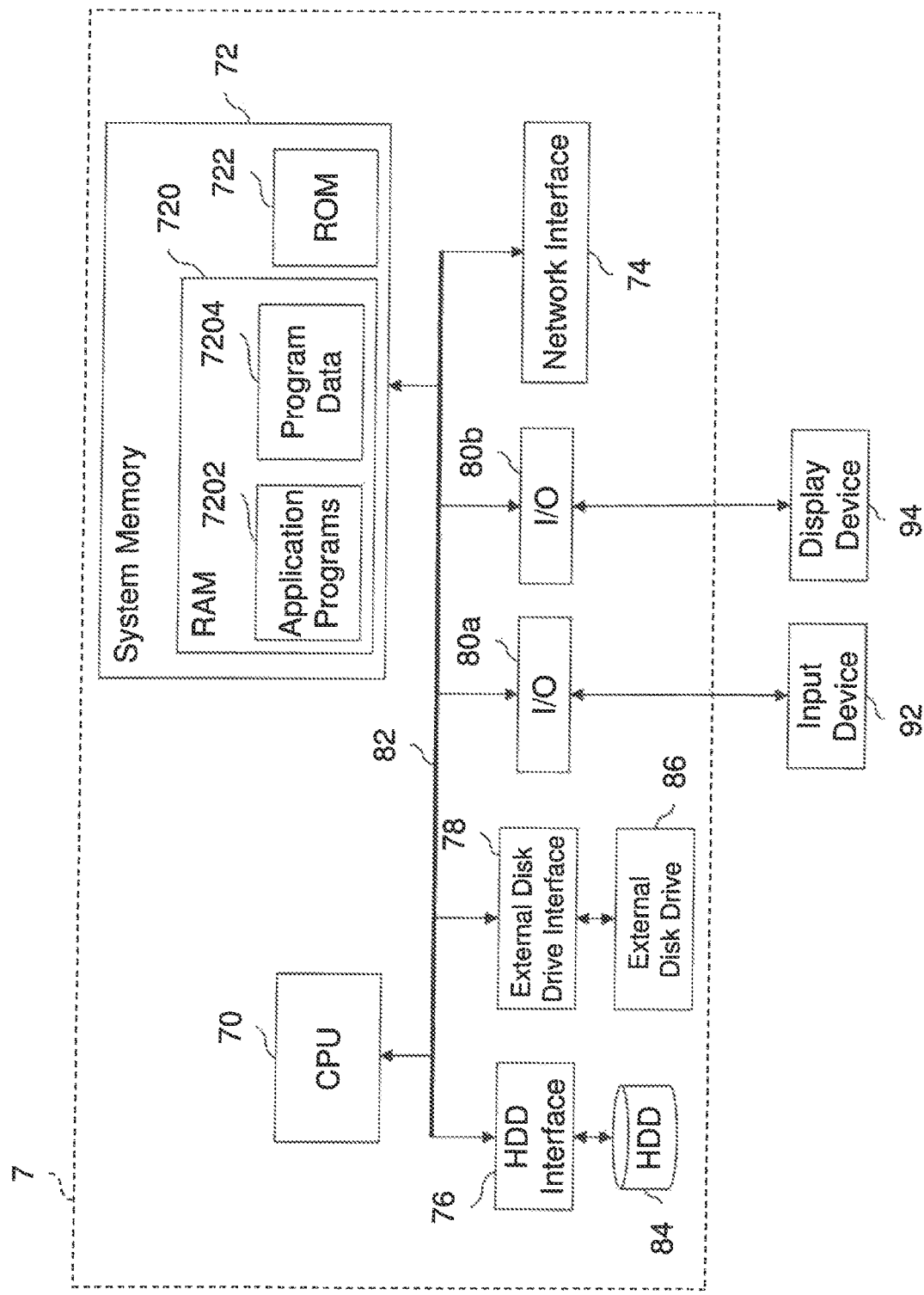
FIG. 12 shows an exemplary hardware configuration of a computer that may be used to implement at least a part of the system described herein.

FIG. 12 shows an exemplary hardware configuration of a computer that may be used to implement the client device 10, the backend system 20 and/or the chatbot system 30. The computer 7 shown in FIG. 12 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the method for collecting and/or retrieving information relating to objects, as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 12, the computer 7 may further be connected to a printer and/or an imaging device such as a camera, via corresponding I/O interfaces and the system bus 82.

In addition or as an alternative to an implementation using a computer 7 as shown in FIG. 12, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method for providing an interface between a frontend application configured to receive one or more user inputs in a natural language and a backend system configured to provide a service to a user, the method comprising:
    receiving a text input in the natural language via the frontend application;
    performing computation using the received text input and a neural network, the neural network comprising:
        a convolutional layer configured to generate feature values by applying one or more filters to an input matrix obtained from the received text input, each of the one or more filters having a window size corresponding to one or more words contained in the text input;
        one or more long short-term memory, LSTM, layers configured to:
            receive a set of additional input parameters from a source external to the neural network, the additional input parameters relating to an action to be provided by the backend system, and
            generate output values by processing at least a part of the feature values generated by the convolutional layer and the additional data,
            wherein the set of additional input parameters is further used to train the neural network; and
        an output layer configured to generate an output vector based on the output values generated by the one or more LSTM layers, the output vector representing the action to be performed by the backend system in response to the received text input;
    identifying the action represented by the output vector generated as a result of the computation;
    communicating the identified action to the backend system for the backend system to perform the identified action; and
    providing the frontend application with a text output in the natural language based on the identified action.

2. The computer-implemented method according to claim 1, wherein the convolutional layer comprised in the neural network is configured to apply a plurality of filters to the input matrix for generating the feature values, the plurality of filters having different window sizes.

3. The computer-implemented method according to claim 2, wherein the one or more LSTM layers comprised in the neural network are configured to process all the feature values generated by the convolutional layer for generating the output values.

4. The computer-implemented method according to claim 1, wherein the neural network (50 *a*) further comprises a max-pooling layer configured to perform a max-pooling operation to the feature values generated by the convolutional layer; and
    wherein the one or more LSTM layers comprised in the neural network are configured to process values selected from the feature values in the max-pooling operation for generating the output values.

5. The computer-implemented method according to claim 4, wherein the one or more LSTM layers comprised in the neural network are configured to process not only at least the part of the feature values generated by the convolutional layer but also additional input parameters relating to the service provided by the backend system for generating the output values.

6. The computer-implemented method according to claim 5, further comprising:
receiving a sequence of possible text inputs and information indicating an action to be taken by the backend system in response to each of the possible text inputs; and
training the neural network using a sequence of input matrices obtained from the sequence of the possible text inputs and the information indicating the action to be taken by the backend system in response to each of the possible text inputs.

7. A system for providing an interface between a frontend application configured to receive one or more user inputs in a natural language and a backend system configured to provide a service to a user, the system comprising one or more processors configured to:
receive a text input in the natural language via the frontend application;
perform computation using the received text input and a neural network, the neural network comprising:
a convolutional layer configured to generate feature values by applying one or more filters to an input matrix obtained from the received text input, each of the one or more filters having a window size corresponding to one or more words contained in the text input;
one or more long short-term memory, LSTM, layers configured to:
receive a set of additional input parameters from a source external to the neural network, the additional input parameters relating to an action to be provided by the backend system, and
generate output values by processing at least a part of the feature values generated by the convolutional layer and the additional data,
wherein the set of additional input parameters is further used to train the neural network; and
an output layer configured to generate an output vector based on the output values generated by the one or more LSTM layers, the output vector representing an action to be performed by the backend system in response to the received text input;
identify the action corresponding to the output vector generated as a result of the computation;
communicate the identified action to the backend system for the backend system to perform the identified action; and
provide the frontend application with a text output in the natural language based on the identified action.

8. The system according to claim 7, wherein the convolutional layer comprised in the neural network is configured to apply a plurality of filters to the input matrix for generating the feature values, the plurality of filters having different window sizes; and
wherein the one or more LSTM layers comprised in the neural network may be configured to process all the feature values generated by the convolutional layer for generating the output values.

9. The system according to claim 8, wherein the one or more LSTM layers comprised in the neural network are configured to process not only at least the part of the feature values generated by the convolutional layer but also additional input parameters relating to the service provided by the backend system for generating the output values.

10. The system according to claim 8, wherein the one or more processors are further configured to:
receive a sequence of possible text inputs and information indicating an action to be taken by the backend system in response to each of the possible text inputs; and
train the neural network using a sequence of input matrices obtained from the sequence of the possible text inputs and the information indicating the action to be taken by the backend system in response to each of the possible text inputs.

11. A system for training a neural network to provide an interface between a frontend application configured to receive one or more user inputs in a natural language and a backend system configured to provide a service to a user, the system comprising one or more processors configured to:
receive a sequence of possible text inputs and information indicating an action to be taken by the backend system in response to each of the possible text inputs; and
train the neural network using a sequence of input matrices obtained from the sequence of the possible text inputs and the information indicating the action to be taken by the backend system in response to each of the possible text inputs,
wherein the neural network comprises:
a convolutional layer configured to generate feature values by applying one or more filters to an input matrix obtained from a text input, each of the one or more filters having a window size corresponding to one or more words contained in the text input;
one or more long short-term memory, LSTM, layers configured to:
receive a set of additional input parameters from a source external to the neural network, the additional input parameters relating to an action to be provided by the backend system, and
generate output values by processing at least a part of the feature values generated by the convolutional layer and the additional data,
wherein the set of additional input parameters is further used to train the neural network; and
an output layer configured to generate an output vector based on the output values generated by the one or more LSTM layers, the output vector representing an action to be performed by the backend system in response to the text input.

* * * * *